H. E. HEILBRUN.
RAT TRAP.
APPLICATION FILED DEC. 2, 1918.
1,315,833.
Patented Sept. 9, 1919.
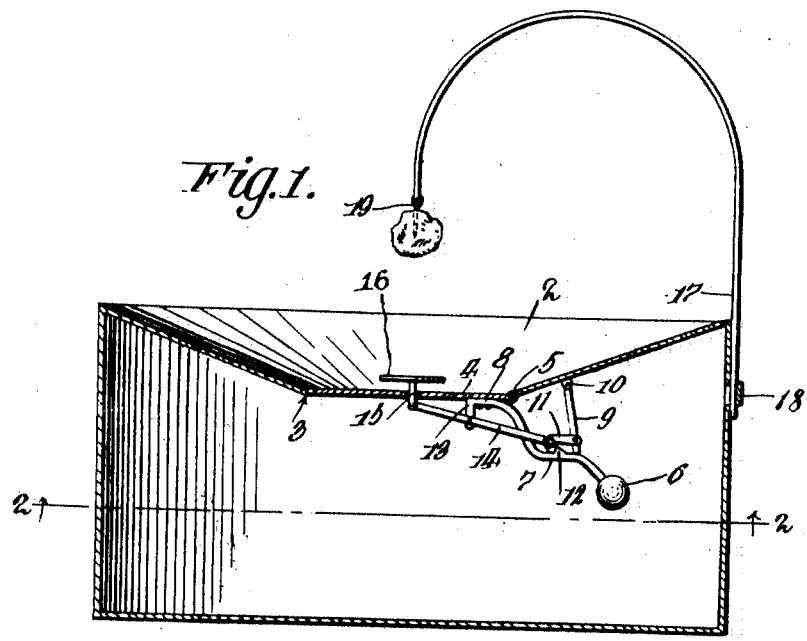
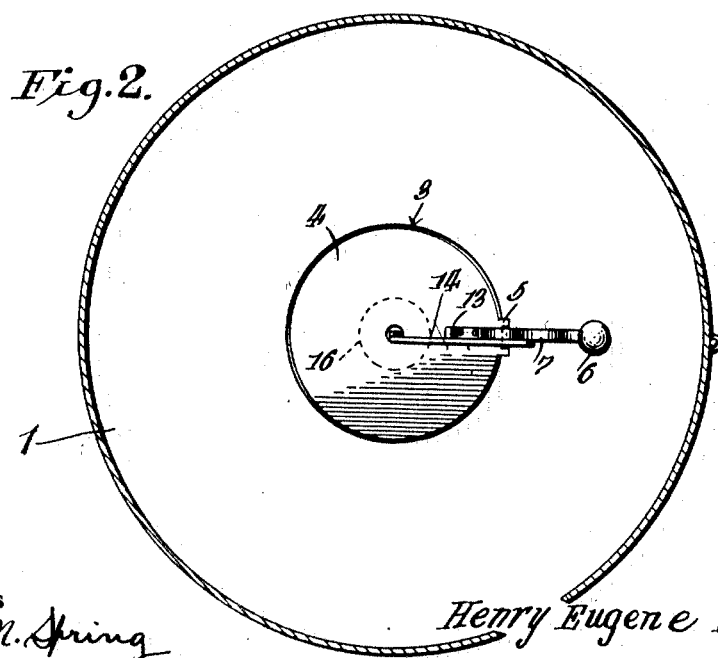
WITNESSES
Guy M. Spring
L. B. Middleton
INVENTOR
Henry Eugene Heilbrun.
BY Richard B. Owen.
ATTORNEY

UNITED STATES PATENT OFFICE.

HENRY EUGENE HEILBRUN, OF DUBOIS, PENNSYLVANIA.

RAT-TRAP.

1,315,833.　　　　　Specification of Letters Patent.　　Patented Sept. 9, 1919.

Application filed December 2, 1918.　Serial No. 265,030.

*To all whom it may concern:*

Be it known that I, HENRY EUGENE HEILBRUN, a citizen of the United States, residing at Dubois, in the county of Clearfield and State of Pennsylvania, have invented certain new and useful Improvements in Rat-Traps, of which the following is a specification.

This invention relates to new and useful improvements in rat traps and the principal object of the invention is to provide a device of this character which will catch and retain the rat and which will be self setting.

Another object of the invention is to so arrange the bait that after once being placed it will remain in position as the rats are unable to reach it.

A further object of the invention is to provide a trap door with means associated therewith which will prevent the door from opening until the rat is in the center thereof, so as to avoid a premature opening of the door and thus scare the rat.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:

Figure 1 is a sectional view through a trap.

Fig. 2 is a section on line 2—2 of Fig. 1.

In these figures 1 indicates a receptacle, preferably made in circular form. This receptacle is provided with a top 2 inclined downwardly toward the center where it is provided with an opening 3. 4 indicates a trap door normally closing this opening and hinged to the top at 5. This door is held shut by means of the weight 6 secured to the lever 7 secured to the door at 8. A stop lever 9 pivoted to the top at 10 engages the lever 7 to prevent upward movement of this weighted lever, and thus hold the door locked, and this lever is held in engaging position by means of a catch 11 pivoted thereto near its lower end and engaging a shoulder 12 on the lever 7, thus holding the lever against movement. The lever 7 is provided with a bent down end 13 to which is pivoted a link 14 which has one end pivoted to the catch 11 and its other end pivoted to the stem 15 of a small platform 16 located in the center of the door, the stem passing through a hole in the door. A bait carrying rod 17 is removably secured in a lug 18 formed on the side of the receptacle and this rod has its upper end curved so as to bring the bait directly above the platform 16, the rod carrying a pointed pin 19 to receive the bait.

With the door closed and the trap set the platform 16 is located above the door, and when a rat, attracted by the bait, walks down the inclined top on to the door the said door is prevented from being opened by reason of the fact that the parts are held in locked position by means of the links and catch. As the rat discovers that the bait is above him he will climb on the platform 16 to reach the bait and his weight will cause said platform to lower and thus lower the end of the link 14 and cause its other end to rise, thus moving the catch 11 upwardly out of engagement with the shoulder 12. As the weight of the door 4 and the rat is heavier than the weight 6, the door will swing downwardly, thus causing the weighted end 6 of the lever 7 to swing upwardly. Since the stop lever 9 is inclined with relation to the lever 7, it will swing upwardly with the lever 7 to permit the door 4 to swing downwardly to cast the rat into the receptacle. As soon as the rat leaves the door 4, the weight 6 will cause said door to close and the catch 11 will engage the shoulder 12 and thus lock the parts in closed position in readiness to entrap another rat.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. The combination with a swinging door, of a vertically movable platform, a weighted lever normally retaining said door in a closed position, a stop lever engaging said weighted lever, locking means for retaining said stop lever in engagement with said weighted lever, and means connected to said platform and to said locking means to operate said locking means.

2. In a trap, the combination with a swinging door, of a vertically movable platform, a weighted lever normally retaining said door in a closed position, a shoulder on said lever, a stop lever pivotally connected to the trap and engaging said weighted lever, a catch pivoted to said stop lever and engaging said shoulder and a link having one end pivoted to said platform and another end pivoted to said catch for operating the catch when the platform moves downwardly.

3. A trap comprising a trap door, a weighted lever connected with said trap door, a stop lever pivoted to the trap and being inclined with relation to the weighted lever whereby the end of said stop lever may slide upon the weighted lever, a catch pivoted to said stop lever and engaging the weighted lever, a platform positioned above said door, and means connecting the platform to the catch for permitting the door to swing when the platform moves downwardly.

4. A rat trap comprising a trap door, a weighted lever connected with the trap door, a second lever pivoted to the trap, means for locking said lever to the weighted stop lever, a member movably arranged in the trap door and a pivoted link connecting said member to the said locking means for releasing the same when a rat gets on said movable member.

In testimony whereof I affix my signature in presence of two witnesses.

HENRY EUGENE HEILBRUN.

Witnesses:
ETHEL HEILBRUN,
Mrs. HARRY M. PHILLIPS.

Copies of this patent may be obtained for five cents each, by addressing the "Commissioner of Patents, Washington, D. C."